US 7,113,477 B1

(12) United States Patent
O'Toole

(10) Patent No.: US 7,113,477 B1
(45) Date of Patent: Sep. 26, 2006

(54) TRAFFIC MEASUREMENT COLLECTION IN A TELECOMMUNICATION NETWORK

(75) Inventor: Maureen O'Toole, Plano, TX (US)

(73) Assignee: Alcatel, Paris (FR)

( * ) Notice: Subject to any disclaimer, the term of this patent is extended or adjusted under 35 U.S.C. 154(b) by 1019 days.

(21) Appl. No.: 10/040,503

(22) Filed: Nov. 9, 2001

(51) Int. Cl.
*G06F 11/00* (2006.01)
*H04J 3/16* (2006.01)

(52) U.S. Cl. .................. 370/229; 370/235; 370/465

(58) Field of Classification Search ........ 370/233–235, 370/229, 230.01, 465
See application file for complete search history.

(56) References Cited

U.S. PATENT DOCUMENTS

| | | | |
|---|---|---|---|
| 5,742,587 A * | 4/1998 | Zornig et al. ............... | 370/235 |
| 5,768,258 A * | 6/1998 | Van As et al. .............. | 370/236 |
| 6,118,761 A * | 9/2000 | Kalkunte et al. ........... | 370/229 |
| 6,519,264 B1 * | 2/2003 | Carr et al. .................. | 370/449 |
| 6,678,245 B1 * | 1/2004 | Cooper et al. .............. | 370/230 |

* cited by examiner

*Primary Examiner*—Afsar Qureshi
(74) *Attorney, Agent, or Firm*—TTom Gellenthien; Craig A. Hoersten; V. Lawrence Sewell

(57) ABSTRACT

The present invention provides an apparatus, system and method of traffic measurement for a node in a telecommunication network. A communication linkset is monitored and a traffic measurement collection is triggered when the linkset is determined to be overdriven or overloaded. For an overdriven linkset, outbound messages are examined to determine the associated communication linksets providing traffic to the overloaded linkset and a count is initiated for messages received on those associated communication linksets.

20 Claims, 3 Drawing Sheets

| Incoming Linkset Number | Count of MSUs on each Incoming Linkset Associated with the Overloaded Linkset |
|---|---|
| 1 | 0 |
| 2 | 12 |
| 3 | 300 |
| 4 | 0 |
| 5 | 5 |
| 6 | 102 |
| 7 | 36 |
| .... | |
| Max Linksets | |

Report Array for Overloaded Linkset

TRAFFIC MEASUREMENT COLLECTION IN A TELECOMMUNICATION NETWORK

TECHNICAL FIELD OF THE INVENTION

The present invention relates to telecommunications and, more particularly, to an apparatus, system and method for traffic measurements in a telecommunication network.

DESCRIPTION OF RELATED ART

Within the telecommunication industry, an ever present need exists to accurately manage traffic flow. A knowledge of accurate traffic flow allows a network operator to balance loads among different nodes within a network so that network overloading and other problems may be reduced. Reduced network overloading in turn improves overall network performance.

The network operator can use traffic flow information to prevent further traffic congestion on a network node, for example, which may overload and/or degrade performance. The network operator can eliminate the overload by rerouting the traffic sources which are causing the congestion event. Traffic information may also be used for other network management functions such as decisions regarding traffic source database sharing, for example.

With ever increasing development and subsequent deployment, new network services can be introduced by local exchange carriers, for example, more rapidly and with fewer associated development costs than earlier in networks. Not surprisingly, operators have successfully introduced a myriad of new network services to network subscribers in the past few years, and many more can be expected in the future.

As a result of the introduction of this myriad of new network services, the flow of network traffic at various levels of the network will increase substantially, and the need to effectively monitor and control network traffic will become an even more important necessity to prevent network overload related problems.

Traffic measurements can be performed at several locations within a telecommunication network and several techniques may be employed. For example, traffic metering can be performed continuously on each traffic linkset. However, continuously metering communication linksets requires extensive time and usage of network assets.

Another method for traffic metering is to sample only a small percentage of network traffic on each linkset or to only sample a small percentage of linksets. By sampling infrequently, data gathering (collection) and/or storage searches required during traffic rate estimation is reduced. Infrequent sampling, however, also reduces estimation accuracy unless a large number of samples are taken (which further consumes time and processing power). Accuracy must therefore be balanced with cost in these type of sampling configurations.

SUMMARY OF THE INVENTION

The present invention achieves technical advantages as an apparatus, system and method of traffic measurement for a node in a telecommunication network. A communication linkset is monitored and a traffic measurement collection is triggered when the linkset is determined to be overdriven or overloaded. For an overloaded linkset, outbound messages are examined to determine the associated communication linksets providing traffic to the overloaded linkset and a count is initiated for messages received on those inbound linksets. A separate threshold value can be selected for each communication linkset in the node and a set of communication linksets can be selected for continuous measurement collection. The traffic measurement collection is terminated after a predetermined period or following a determination that the rate of outgoing messages has reached a predetermined underload threshold. Measurements can be collected in a type of array for each communication linkset and stored for future use.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
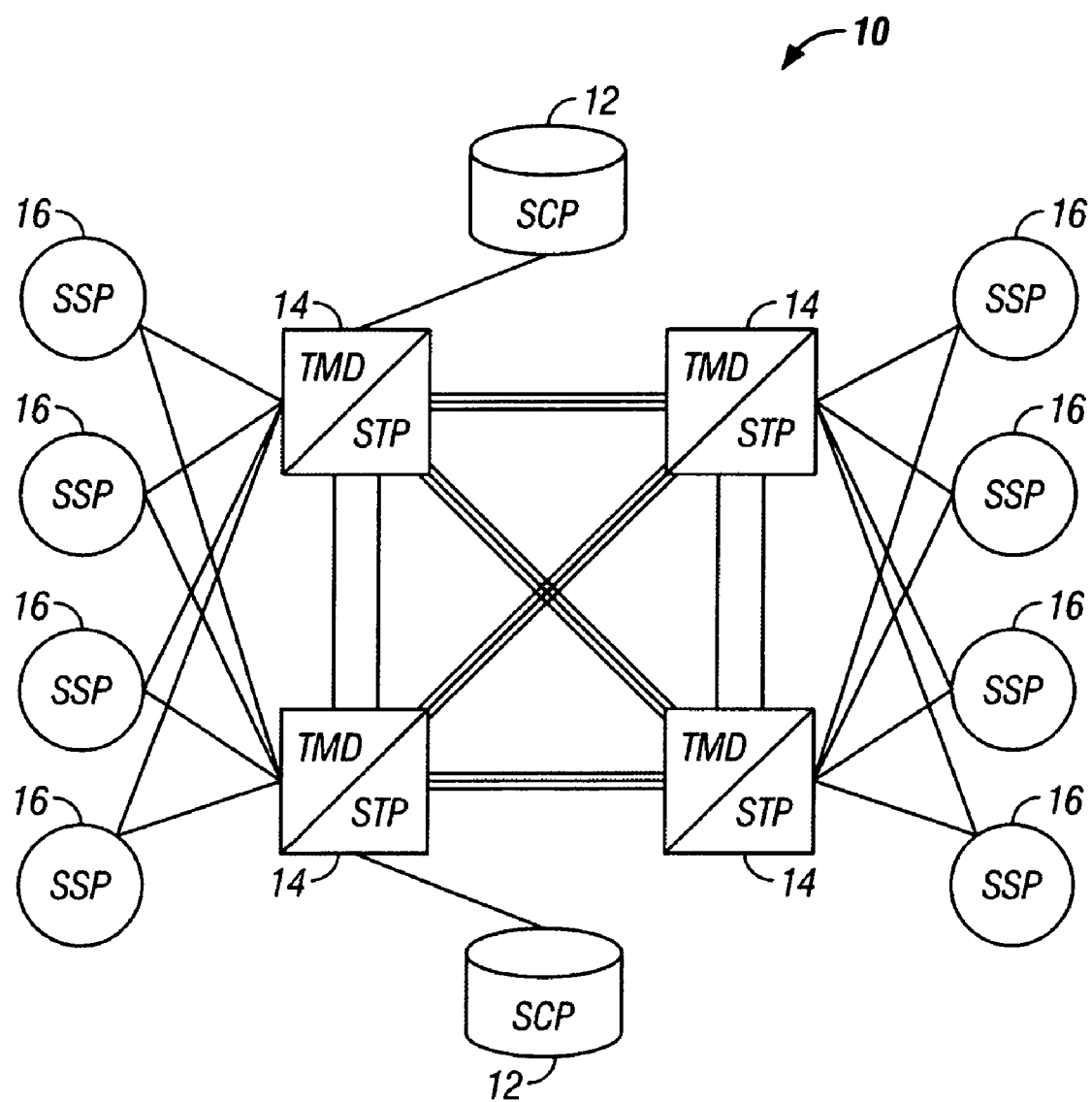
FIG. 1 illustrates a system diagram of a telecommunication network for traffic measurement collection in accordance with an exemplary embodiment of the present invention.

Referring now to FIG. 1 there is illustrated a system diagram of a telecommunication network 10 for traffic measurement collection in accordance with an exemplary embodiment of the present invention. The network 10 can include a plurality of network nodes or signaling points coupled by communication linksets. The communication linksets may, for example, comprise coaxial cables, optical fiber bundles, or microwave links, and the network nodes may comprise a trunk exchange switch node, a local exchange switch node, a special service switch node, some form of mobile telecommunications network, or the like.

A signaling point has the ability to perform message discrimination (read the address and determine if the message is for that node), as well as to route or transfer messages to another signaling point. There are three different types of signaling points illustrated in FIG. 1, although other types of signaling points and associated databases and registers are contemplated. The signaling points include: 1) Service Switching Point (SSP) 16, Signal Transfer Point (STP) 14, and Service Control Point (SCP) 12. The traffic measurement device (TMD) is shown to be associated with the STP 14, however, it can also be associated with the other signaling points. It should be understood that this example is only illustrative, and that many other system configurations are possible.

The signaling points provide access to the network 10, provide access to databases used by switches inside and outside of the network, and transfer messages to other signaling points within the network 10. The signaling points are generally deployed in pairs for redundancy and diversity. The network is interconnected to ensure the network can provide alternate paths in the event of failures. These alternate paths provide the reliability needed in a network of this nature to provide insurance that messages can always reach their destinations. To assist in this type of route management, message traffic is monitored for analysis so that network routing efficiency can be improved.

Figure 2:
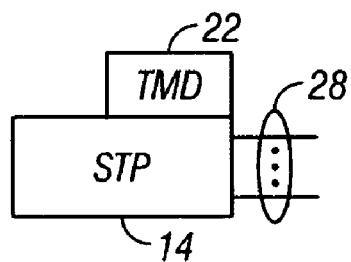
FIG. 2 illustrates a block diagram of an signal transfer point which includes a traffic measurement device in accordance with an exemplary embodiment of the present invention.

Referring now to FIG. 2 there is illustrated a block diagram of an STP 14 which includes a traffic measurement device (TMD) 22 in accordance with an exemplary embodiment of the present invention. The STP 14 also includes an operatively coupled plurality of communication linksets 28.

The TMD 22 triggers the collection of traffic measurements when the rate of outgoing message signaling units (MSUs per second) on a particular communication linkset exceeds a user provisioned or predetermined value. Note that a separate user provisioned value can be assigned to each outbound communication linkset to be monitored. A communication linkset can be considered overdriven, for example, when the rate of outgoing messages, (e.g., MSUs per second) has exceeded the engineered capacity of the linkset. When this happens, the TMD equipped STP 14 is triggered to start collecting measurements for the linkset on which the messages came into the STP 14.

Note that the traffic measurement device 22 is illustrated coupled directly to the STP 14, however, the traffic measurement device 22 can be coupled within or remotely from the STP 14 or any other network node as previously mentioned. It should also be noted that the traffic measurement device 22 can be implemented in hardware, software or a combination thereof.

Figures 3, 4:
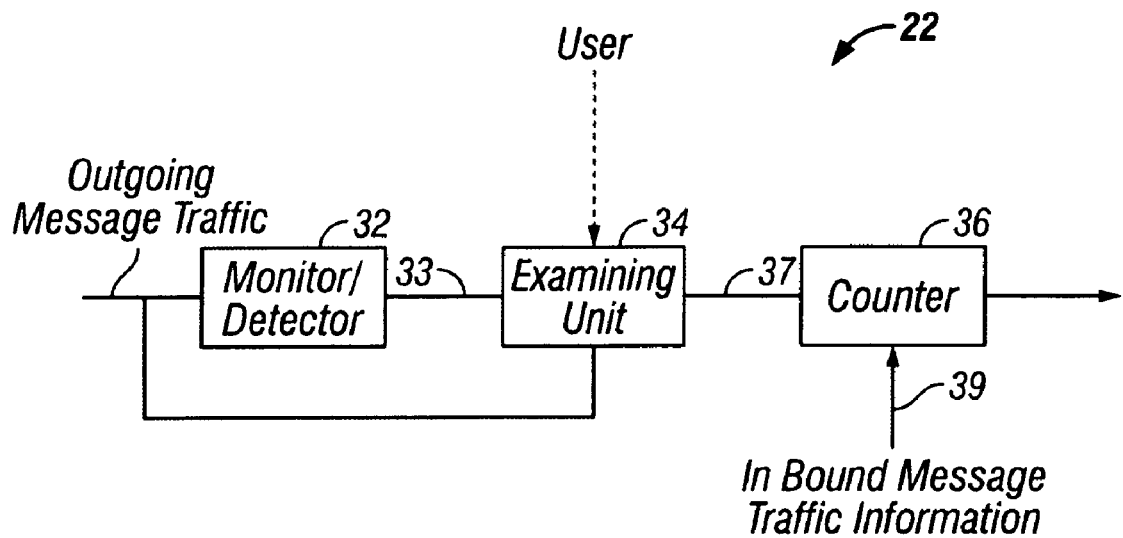
FIG. 3 illustrates a block diagram of a traffic measurement device in accordance with an exemplary embodiment of the present invention.
FIG. 4 illustrates a tabulation or array of traffic measurement results for a traffic measurement device in accordance with an exemplary embodiment of the present invention.

Referring now to FIG. 3 there is illustrated a block diagram of a traffic measurement device (TMD) 22 in accordance with an exemplary embodiment of the present invention. The TMD 22 includes a monitor/detector 32, an examining unit 34, and a counter 36. The monitor/detector 32 has an input for receiving the messages (i.e., message signaling units) to be transmitted on one or more communication linksets. The monitor/detector 32 is further operably configured to determine the outgoing message rate on each of the communication linksets to be monitored and to compare this message rate to a respective overload threshold for detection of an overload threshold transition. The monitor/detector 32 is also configured to send a signal, on an output 33, indicating the detection of the overload threshold transition with respect to a particular outbound linkset. It should be noted that one or more linksets can be monitored simultaneously.

The examining unit 34 includes a first input for receiving an indication of a detection of the overload threshold transition for a particular outbound linkset and, upon receiving such an indication, commences measurement collection. The examining unit 34 includes a second input for receiving the messages to be transmitted on a communication linkset determined to be overloaded, and is configured to examine those messages to determine the communication linksets on which they were received. This identifies the communication linksets which are contributing to the overload communication linkset condition.

The counter 36 is coupled to the examining unit 34 to receive therefrom at 37 information indicative of the communication linksets that have been identified by the examining unit 34. In response to this information, the counter 36 begins counting the number of incoming messages received on each of the identified communication linksets. The counter 36 also has an input 39 for receiving information indicative of the message unit traffic on the identified communication linksets, for example, the inbound messages themselves. The counter 36 is configured to increment a count element for each message received, and tabulate and/or store the incremental count for each respective identified communication linksets that the examining unit 34 has associated with the overloaded communication linkset. In other words, the TMD 22 builds a one dimensional array that contains the counts of MSUs received from each possible linksets.

For example, if communication linkset number 25 is detected as being in the traffic overload state, the TMD 22 begins collection measurements on each of the linksets that can contribute traffic to the linkset number 25. The message distribution for linkset number 25 can be arranged in tabulation or array form. FIG. 4 illustrates an exemplary tabulation or array of traffic measurement results for linkset number 25. The counter 36 can also be configured to transmit the tabulated data to a storage device or operator management type facility as a report on a man to machine interface (MMI), for example, to be displayed to a user.

At least one embodiment of the TMD 22 of the present invention allows a network operator, for example, to use network assets to collect traffic measurements only on overdriven or overloaded communication linksets associated with one or more of the STPs 14, thus saving asset allocation expenses.

In at least one exemplary embodiment of the present invention (illustrated by broken line in FIG. 3), the examining unit 34 is configured to enable a user to "nominate" a specific linkset for measurement collection. In this case, measurements are collected for that linkset regardless of the outgoing MSU rate. In other words, the linkset does not need to experience an overload condition in order to collect the incoming traffic measurements. This does not prevent the detection of overload on other remaining linksets. The user can also enable a time period restriction means for limiting the traffic measurement collection in extended periods of overload. For example, the user can choose a limit time period of five minutes in which traffic collection is restricted to a maximum of five minutes following initiation of traffic collection.

The monitor/detector 32 can also be configured to compare the outbound communication linksets' message rate with a respective predetermined underload threshold for detection of an underload threshold transition. The monitor/detector 32 can also be configured to send a signal on output 33 when an underload transition occurs, instructing a termination of the of the measurement collection activity; and issue an information and problem report when the TMD 22 begins the measurement collection activity on a linkset and when the TMD 22 stops the measurement collection activity.

One advantageous characteristic of the traffic measurement device 22 of the present invention is memory savings and the ability to use less resources to collect and store the measurements. Memory savings can be great, particularly in an integrated system where the measurements are performed real-time and in-line with traffic processing memory. In theses systems, memory is typically not plentiful and even if it was, communication bandwidth would be sucked-up trying to get these massive amounts of measurements out of the processor and onto a storage device.

Figure 5:
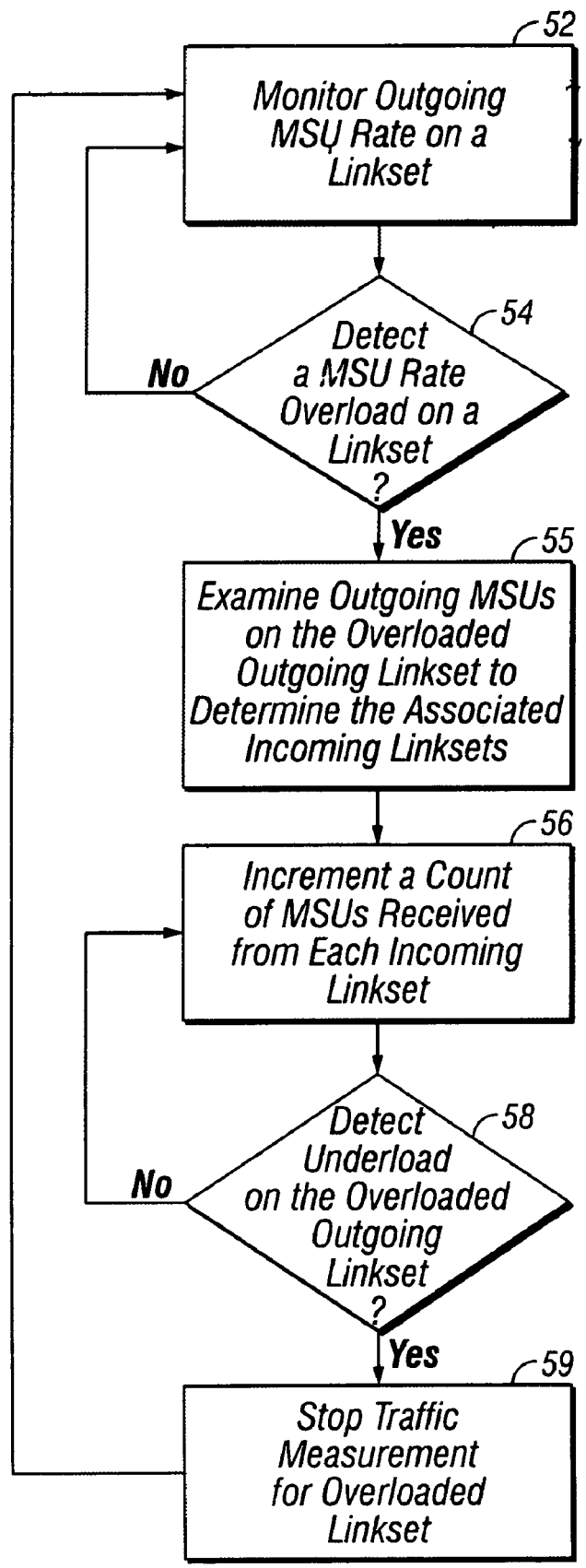
FIG. 5 illustrates a simplified method diagram for traffic measurement collection in a telecommunication network in accordance with an exemplary embodiment of the present invention.

Referring now to FIG. 5 there is illustrated a simplified method diagram for traffic measurement collection in a telecommunication network in accordance with an exemplary embodiment of the present invention. To some extent these steps have already been mentioned and the discussion of them here can be somewhat abbreviated.

In act 52, the message rate is monitored for one or more communication linksets for a network node. Subsequently, the message unit rate is compared to a predetermined overload threshold and upon detecting an overload threshold transition (i.e., the message rate exceeds the predetermined overload threshold) 54 a message examination 55 is initiated. At this point an indication can be transmitted to indicate that an overdrive condition is detected and collection activity is to begin. If there is no detection of an overload threshold transition, operation returns to simply monitoring for the next possible overload threshold transition.

In act 55, following a detected overload threshold transition for a particular linkset, the outbound message units are examined to determine those linksets that are providing traffic (i.e., message units) to the particular overloaded linkset. Once the traffic providing linksets are identified, a count is incremented at 56 for each incoming message on each of the identified linksets.

In act 58, the message rate of the overloaded communication linkset is further monitored and compared with a predetermined underload threshold and upon detecting an underload threshold transition (i.e., the message rate falls to or below the predetermined underload threshold) the measurement collection activity is terminated at 59. The incoming message counts can be stored in a table identified with the corresponding overloaded linkset (see also FIG. 4). The table can contain other incoming message counts identified with other overloaded linksets if more than one outbound communication linkset is being monitored. This table can be transmitted to an operator management type facility as a report on a MMI, for example, to be displayed to a user for analysis. The report can also be stored for future use. Further, the measurement collection activity can be aborted anytime upon receiving a network failure condition indication. Following a measurement collection activity termination, operation is transferred to monitoring for the next possible overload threshold transition at 52.

Although a preferred embodiment of the apparatus, system and method of the present invention has been illustrated in the accompanied drawings and described in the foregoing detail description, it will be understood that the invention is not limited to the embodiments disclosed, but is capable of numerous rearrangements, modifications, and substitutions without departing from the spirit of the invention as set forth and defined by the following claims.

What is claimed is:

1. A method of traffic measurement collection in a telecommunication network of interconnected nodes arranged to provide connection between network resources, said method comprising:
    comparing a message unit rate on at least one of a plurality of monitored communication linksets at a network node to a predetermined overload threshold, wherein the predetermined overload threshold is separate for each of said plurality of monitored communication linksets;
    if said unit rate exceeds said overload threshold, identifying communication linksets which provide traffic to said monitored communication linkset; and
    for each of said identified communication linksets, incrementing a count element for each message unit received on respective identified communication linksets.

2. The method of claim 1 further comprising comparing said message unit rate on said at least one of a plurality of monitored communication linksets to a predetermined underload threshold and terminating traffic measurement collection if said underload threshold exceeds said message unit rate.

3. The method of claim 2 further comprising providing an indicator upon terminating of traffic measurement collection.

4. The method of claim 1 further comprising providing an indicator upon commencement of traffic measurement collection.

5. The method of claim 1 further comprising providing a traffic measurement report including said incremented count element for said respective identified communication linksets.

6. The method of claim 1 wherein said network node is a signaling transfer point.

7. The method of claim 1 further comprising limiting traffic measurement collection to a predetermined maximum period.

8. A method for traffic measurement collection in a telecommunication network of interconnected nodes, said method comprising:
    comparing a message unit rate on each of a first set of monitored communication linksets at a network node to a respective predetermined overload threshold, wherein the predetermined overload threshold is separate for each of said first set of monitored communication linksets;
    if said message unit rate on one of said monitored communication linksets exceeds said overload threshold, identifying communication linksets which are providing traffic to said one monitored communication linkset; and
    for each of said identified communication linksets, incrementing a count element for each message unit received on respective identified communication linksets.

9. The method of claim 8 further comprising selecting a second set of monitored communication linksets at said network node for traffic measurement collection, comprising:
    for each of said second set of monitored communication linksets, examining outgoing message units for determining communication linksets associated with said outgoing message units; and
    for each of said determined communication linksets, incrementing a count element for each message unit received on respective determined communication linksets, wherein the predetermined overload threshold is separate for said first set of monitored communication linksets and for said second set of monitored communication linksets.

10. The method of claim 8 further comprising comparing said message unit rate on one of said second set of monitored communication linksets to a predetermined underload threshold and terminating traffic measurement collection for said one monitored communication linkset if said underload threshold exceeds said message unit rate of said one outgoing linkset.

11. The method of claim 8 further providing a traffic measurement report including said incremented count element for each of said respective identified communication linksets.

12. The method of claim 8 wherein said network node is a signaling transfer point.

13. An apparatus for traffic measurement collection in a telecommunication network of interconnected nodes, said apparatus comprising:
    a monitor having an input for receiving message units for transmission on at least one of a plurality of monitored communication linksets of a network node and operable to determine a message unit rate for each of said monitored communication linksets, said monitor operable for comparing said message unit rate to a predetermined overload threshold, wherein said predetermined overload threshold is separate for each of said monitored communication linksets, said monitor further having an output for transmitting a first indicator for commencing said traffic measurement collection upon detecting that said message unit rate exceeds said overload threshold;
    an examiner having an input coupled to said monitor for receiving said first indicator, said examiner responsive to said first indicator for identifying communication linksets which provide traffic to said monitored communication linkset; and
    a counter coupled to said examiner for receiving therefrom information indicative of said identified communication linksets, said counter operable, for each respective identified communication linkset, to increment a count element for each message unit received.

14. The apparatus of claim 13, wherein said monitor is further operable to compare said message unit rate to a predetermined underload threshold and transmit a second indicator for terminating said traffic measurement collection upon detecting that said underload threshold exceeds said message unit rate.

15. The apparatus of claim 13, wherein said network node is a signaling transfer point.

16. The apparatus of claim 13, wherein said network node comprises a plurality of monitored communication linkset.

17. The apparatus of claim 13, wherein said examiner includes an input for permitting a user to direct said examiner to identify a communication linkset for traffic measurement collection for any message unit rate.

18. A telecommunication network with traffic measurement collection capability comprising:
    a plurality of interconnected network nodes, at least one of said network nodes having a plurality of communication linksets coupled to other network nodes; and
    a traffic measurement device coupled to said one network node, said traffic measurement device comprising:
    a monitor having an input for receiving message units for transmission on said plurality of communication linksets and operable to determine a message unit rate for at least one of said communication linksets, said monitor operable for comparing said message unit rate to a predetermined overload threshold, wherein a separate predetermined overload threshold is assigned to each of said communication linksets coupled to said plurality of interconnected network nodes, and wherein a separate predetermined overload threshold is assigned to each of said communication linksets coupled to said other network nodes, said monitor further having an output for transmitting a first indicator for commencing said traffic measurement collection upon detecting that said message unit rate exceeds said overload threshold;
    an examiner having an input coupled to said monitor for receiving said first indicator, said examiner responsive to said first indicator for identifying incoming communication linksets which provide traffic to said at least one communication linkset; and
    a counter coupled to said examiner for receiving therefrom information indicative of said identified communication linksets, said counter operable, for each of said identified communication linksets, to increment a count element for each message unit received.

19. The telecommunication network of claim 18, wherein said one network node is a signaling transfer point.

20. The telecommunication network of claim 18, wherein said examiner includes an input for permitting a user to direct said examiner to identify a communication linkset for traffic measurement collection for any message unit rate.

* * * * *